May 28, 1968

D. G. PIERCE 3,386,073

ELECTRICAL JUNCTION BLOCK

Filed July 25, 1966

INVENTOR:
DENNIS G. PIERCE
BY:

*James E. Nilles*
ATTORNEY

United States Patent Office 3,386,073
Patented May 28, 1968

3,386,073
ELECTRICAL JUNCTION BLOCK
Dennis G. Pierce, Milwaukee, Wis., assignor to Harnischfeger Corporation, West Milwaukee, Wis., a corporation of Wisconsin
Filed July 25, 1966, Ser. No. 568,705
5 Claims. (Cl. 339—214)

ABSTRACT OF THE DISCLOSURE

An electrical junction block in which the connectors for the input conductor wires are located at each end of the insulated bar forming the block, with the connectors for the output conductor wires located at spaced intervals along the bar and between the input connectors.

---

The present invention relates to electrical junction blocks for making electrical connections between a pair of input conductor wires and a plurality of output conductor wires.

A junction block made in accordance with the present invention finds particular but not exclusive utility when used in a multiple operator welding system where electric power is conveyed throughout the welding area by electrical conductor wires and welding power is obtained from the wires at the location where welding is to be undertaken. To obtain such power, injunction blocks are often employed in which input conductor wires that supply electric power may be interconnected with output conductor wires which carry the power to the welding apparatus or to other parts of the system.

In the past, the input conductor wires have been connected to one end of an insulated bar forming the junction block and the output conductor wires have been connected at spaced points along the length of the bar. It has therefore been necessary to size all sections of the insulated bar to carry the total load fed into the end thereof by the input conductor wires regardless of the location or number of output conductor wires connected to the bar. This has caused such prior art junction blocks to be large and bulky and to constitute a safety hazard to workmen moving about the welding area.

In addition, such junction blocks preferably should have means to limit the number of input conductor wires which may be connected thereto and the amount which may be supplied to the junction block, so that if the bar is designed to carry a certain load throughout its entire length, there will be an assurance that the design load will be the maximum load which may be applied thereto.

Accordingly, the present invention provides an improved electrical junction block which overcomes the above shortcomings, and more specifically is small and compact in physical size.

Another object of the present invention is to provide an improved electrical junction block in which the connectors for the input conductor wires are arranged so that any given portion of the insulated bar forming the junction block carries a maximum of one-half the rated load of the junction block, thereby contributing to the small physical size of the block.

Still another object of the present invention is to provide an electrical junction block in which the number of input conductor wires which may be connected thereto is limited, to thereby limit the maximum load which may be supplied to the junction block.

Briefly, the present invention contemplates the provision of an electrical junction block for making electrical connections between a pair of input conductor wires and a plurality of output conductor wires including an elongated insulated conductor bar. Input connectors are located at each end of the bar to supply input power thereto from input conductor wires. A plurality of output connectors are located at spaced intervals along the bar to withdraw the electrical power into output conductor wires as desired. The input and output connectors contain a mutually exclusive keying means which prevents the input conductor wires from being connected to the output connectors of the junction bar and vice versa. This limits the number of input conductor wires which may be connected to the electrical junction block and limits the maximum electrical power which may be supplied to it.

Other aspects and advantages will appear hereinafter as this disclosure progresses, reference being had to the accompanying drawings in which.

Figure 1:
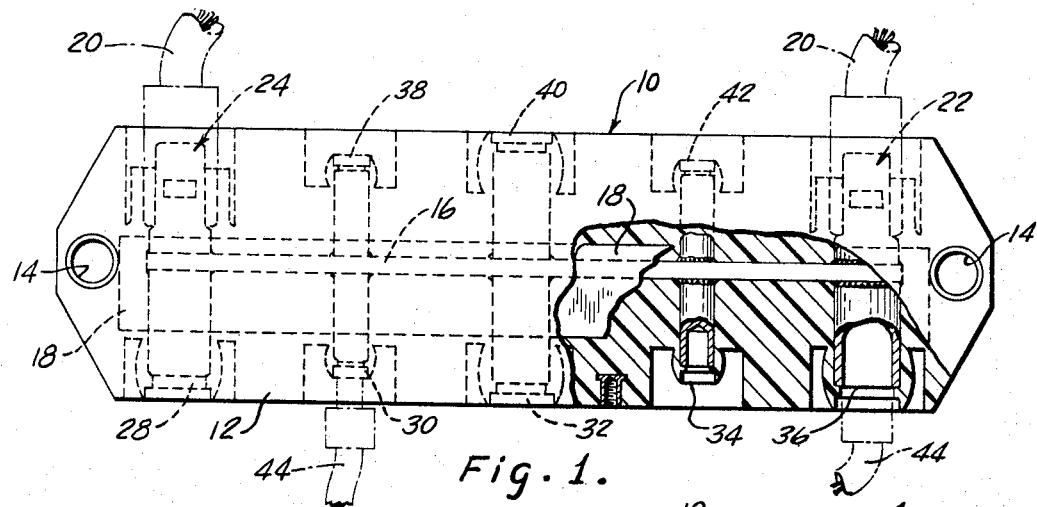
FIGURE 1 is a plan view of the electrical junction block of the present invention.
Figure 2:
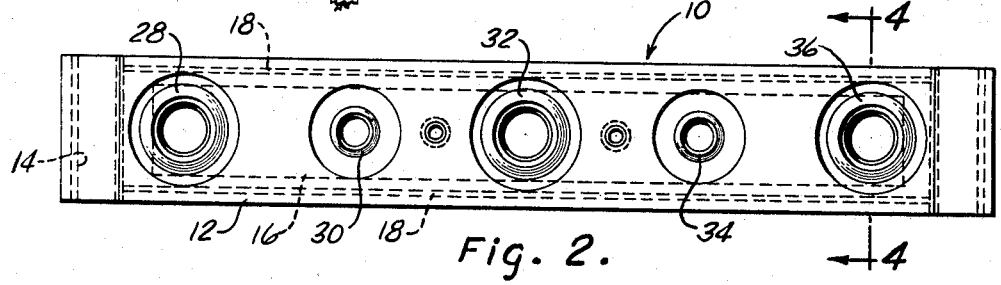
FIGURE 2 is a front view of the junction block of the present invention.
Figure 3:
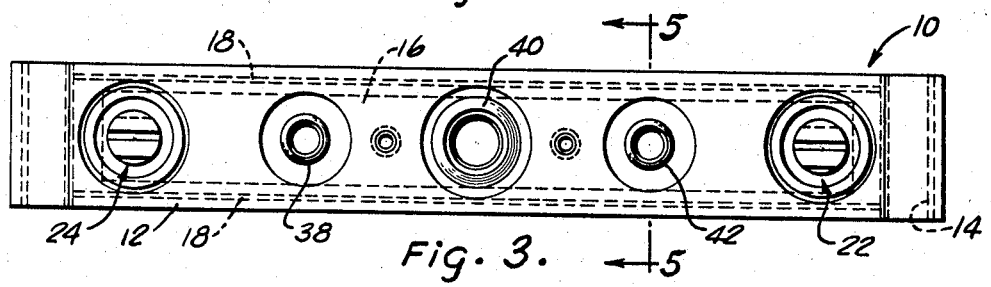
FIGURE 3 is a rear view of the electrical junction block.

Referring in greater detail to the drawings, an electrical junction block 10 includes an insulating body 12 of solid rectangular configuration and is formed of rubber, neoprene, or other electrically nonconducting material to provide insulation to the other elements of junction block 10. While junction block 10 is normally placed on the floor of the work area, a mounting hole 14 may be provided at each end of the junction block for affixing it to a rack or frame if desired. Along each side of junction block 10 is located a plurality of connectors for receiving the input and output conductor wires as hereinafter described. Junction block 10 also includes an elongated conductor bar 16 formed in, and completely surrounded, by insulating body 12. Conductor bar 16 may be formed from a bar or strap of copper or other good electrical conductor. Conductor bar 16 must have sufficient cross sectional area throughout its entire length to carry one-half the rated load of the junction block. As shown in the cross sectional views, insulating body 12 may contain braces 18 molded therein on either side of conductor bar 16 to lend further rigidity and protection to the bar.

Figures 4, 5:
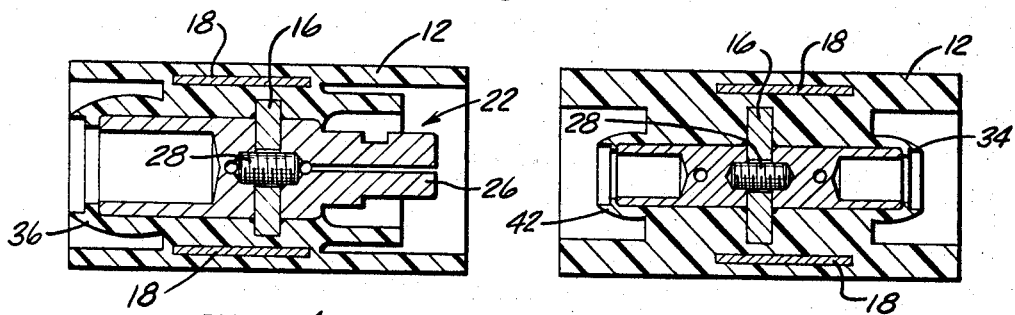
FIGURE 4 is a cross sectional view along line 4—4 of FIGURE 2.
FIGURE 5 is a cross sectional view along line 5—5 of FIGURE 3.

One input input connector for each of the input conductor wires 20 to junction block 10 is located at either end of conductor bar 16. As shown in FIGURE 4, the input connector 22 shown is of the male type, having a keyed projection 26 which mates with a corresponding receiver in the end of input conductor wire 20. Input connector 22 may be threaded on stud 28 extending through conductor bar 16 and may be welded to the bar to insure a good electrical connection between the bar and the connector. Any commonly available male electrical connector may be used for input connectors 22 and 24.

The output connectors 28, 30, 32, 34, 35, 38, 40 and 42 for output conductor wires 44 are located at spaced intervals along conductor bar 16 between connectors 22 and 24. As shown in FIGURE 5, these connectors are of the female type having a receptacle designed to receive a corresponding projection on the end of the output conductor wires 44. For ease of assembly, the output connectors may be fastened to conductor bar 16 by threading them on a stud 28 extending from opposite sides of conductor bar 16 so that the output connectors are fastened on opposite sides of conductor bar 16 and in the same transverse plane. For maximum flexibility, output connectors of two or more sizes may be provided in junction block 10. If desired, junction block 10 may include output connectors opposite input connectors 22 and 24, as shown in FIGURES 1 and 4.

While the embodiment of junction block 10 shown in the figures and described above, contemplates input connectors 22 and 24 as male connectors and output connectors 28 through 42 as female connectors, the type of connector used respectively, may be reversed as long as exclusivity is maintained between the input connectors and the output connectors. However, from a safety standpoint, the power input conductor would be female so that no exposed current carrying element would be present. Consequently, the input connector on the bar is preferably of male configuration.

*Operation*

In operation, either or both of input connectors 22 and 24 are coupled to an input conductor wire 20 and as many output connectors 28 through 34 as necessary are coupled to output conductor wires 44. Electric power flows from the input conductor wires 20, through input connectors 22 and/or 24, conductor bar 16, output connectors 28 through 42 to output conductor wires 44.

Because of the symmetrical arrangement of input connectors 22 and 24, with regard to the output connectors, a maximum of one-half the rated load of junction block 10 will flow through any given portion of conductor bar 16 between the connectors. For example, if each of the input connectors is rated at 750 amperes then the rated load of junction block 10 is 1500 amperes and conductor bar 16 must be dimensioned so as to carry 750 amperes. When only one input connector 22 or 24 is supplying power only the 750 amperes from that input will be present in conductor bar 16 and the current rating of conductor bar 16 is not exceeded. If both input connectors 22 and 24 are supplying 750 amperes of power to conductor bar 16 and the 1500 ampere total power is being withdrawn from output connector 40 in the center of conductor bar 16, each half of the bar is supplying half of the 1500 ampere output and hence the load on each half of the bar is still within the rated load of 750 amperes.

A similar situation obtains for any and all combinations of input connector and output connector utilization so that the current flowing in any given portion of conductor bar 16 is always equal to or less than one-half the rated load. Additionally, since there are only two connectors which may be used as input connectors due to the keyed projections thereon, there is no possibility of exceeding the rated load in conductor bar 16 by the connection of additional input conductor wires to it.

Various modes of carrying out the invention are contemplated as being within the scope of the following claims particularly pointing out and distinctly claiming the subject matter which is regarded as the invention.

What is claimed is:

1. An electrical junction block making electrical connections between a pair of input conductor wires and a plurality of output conductor wires comprising:
   an elongated insulated conductor bar of a cross sectional area throughout its length to carry a maximum of one half the rated load of the junction block;
   a pair of input connectors, one located at each end of said bar; and
   a plurality of output connectors located between said input connectors at spaced intervals along the length of said bar;
   said input and output connectors containing a mutually exclusive keying means preventing the input conductor wires from being connected to output connectors, each input conductor wire and associated connector supplying to the block approximately one-half of the rated load of the junction block.

2. The electrical junction block of claim 1 wherein said input connectors located at each end of said bar are located on the same side of the bar.

3. The electrical junction block as defined in claim 2 further characterized in that an output connector is located directly across from each of said inputs.

4. The electrical junction block of claim 1 wherein said mutually exclusive keying means is a male-female connector arrangement.

5. The electrical junction block set forth in claim 1 further characterized in that said output connectors are located on opposite sides of said block at equally spaced locations therealong.

References Cited

UNITED STATES PATENTS

| | | | |
|---|---|---|---|
| 2,443,509 | 6/1948 | Lundy | 339—214 |
| 2,677,115 | 4/1954 | Stevens | 339—60 |
| 3,107,132 | 10/1963 | Smith | 339—60 |
| 3,107,133 | 10/1963 | Smith | 339—60 |
| 1,765,734 | 6/1930 | O'Neill | 174—114 |
| 1,947,062 | 2/1934 | Rudenberg | 307—69 |
| 3,082,397 | 3/1963 | Clarkson et al. | 339—157 |

FOREIGN PATENTS 494,586  7/1953  Canada.

MARVIN A. CHAMPION, *Primary Examiner.*

R. S. STROBEL, *Assistant Examiner.*